(12) United States Patent
Arora et al.

(10) Patent No.: US 11,004,076 B2
(45) Date of Patent: May 11, 2021

(54) CAMERA DEVICE ENABLED IDENTIFICATION AND DISAMBIGUATION SYSTEM AND METHOD

(71) Applicant: Visa International Service Association, San Francisco, CA (US)

(72) Inventors: Sunpreet Arora, San Mateo, CA (US); Lacey Best-Rowden, San Mateo, CA (US); Kim Wagner, Sunnyvale, CA (US); Saman Sarraf, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/269,419

(22) Filed: Feb. 6, 2019

(65) Prior Publication Data

US 2020/0250679 A1    Aug. 6, 2020

(51) Int. Cl.
*G06Q 20/40* (2012.01)
*G06Q 20/34* (2012.01)
*G06K 19/07* (2006.01)
*G06Q 20/04* (2012.01)
(Continued)

(52) U.S. Cl.
CPC ... *G06Q 20/40145* (2013.01); *G06K 19/0718* (2013.01); *G06Q 20/04* (2013.01); *G06Q 20/341* (2013.01); *G07C 9/21* (2020.01); *G07C 9/25* (2020.01)

(58) Field of Classification Search
CPC ............. G06Q 20/40145; G06Q 20/04; G06Q 20/341; G06Q 20/00; G07C 9/21; G07C 9/25; G07C 9/27; G07C 9/257; G06K 19/0718
See application file for complete search history.

(56) References Cited

U.S. PATENT DOCUMENTS

| 5,280,527 A | 1/1994 | Gullman et al. |
| 5,930,767 A | 7/1999 | Reber et al. |
| 6,000,832 A | 12/1999 | Franklin et al. |

(Continued)

FOREIGN PATENT DOCUMENTS

| EP | 1028401 A2 | 8/2000 |
| WO | 2000014648 A1 | 3/2000 |

(Continued)

*Primary Examiner* — Brian Wilson
(74) *Attorney, Agent, or Firm* — Kilpatrick Townsend & Stockton LLP

(57) ABSTRACT

A method and system of using a vehicle mounted camera device to authenticate a user during an interaction is disclosed. The method includes receiving interaction data regarding an interaction between a user operating a communication device and an access device, the user being near other candidate users. The method then includes determining one or more match indicators, the match indicators generated by comparing different sample biometric templates of the user with different enrolled biometric templates. At least one of the different biometric sample templates may be an image-based biometric template and at least one may be a voice print biometric template. Then the method includes identifying the user based on at least the match indicator associated with the voice print biometric template. The method then includes, if the match indicators are positive match indicators, initiating a process on behalf of the user.

17 Claims, 9 Drawing Sheets

(51) Int. Cl.
   *G07C 9/21* (2020.01)
   *G07C 9/25* (2020.01)

(56) References Cited

U.S. PATENT DOCUMENTS

| | | |
|---|---|---|
| 6,453,301 B1 | 9/2002 | Niwa |
| 7,889,052 B2 | 2/2011 | Berardi et al. |
| 8,856,539 B2 | 10/2014 | Weiss |
| 9,100,826 B2 | 8/2015 | Weiss |
| 9,530,137 B2 | 12/2016 | Weiss |
| 2004/0236632 A1 | 11/2004 | Maritzen et al. |
| 2009/0127328 A1* | 5/2009 | Aissa ................. G06K 9/00885 235/377 |
| 2013/0232073 A1 | 9/2013 | Sheets et al. |
| 2013/0290136 A1 | 10/2013 | Sheets et al. |
| 2018/0054436 A1 | 2/2018 | Wagner |
| 2018/0189769 A1* | 7/2018 | Narasimhan ....... G06Q 20/3278 |
| 2019/0213312 A1* | 7/2019 | Tussy ................. G06K 9/00899 |
| 2019/0279437 A1* | 9/2019 | Borras ................... G06Q 50/30 |

FOREIGN PATENT DOCUMENTS

| | | |
|---|---|---|
| WO | 2004051585 A2 | 6/2004 |
| WO | 2005001751 A1 | 1/2005 |
| WO | 2017019972 A1 | 2/2017 |
| WO | 2017075063 A1 | 5/2017 |
| WO | 2018174901 A1 | 9/2018 |

* cited by examiner

CAMERA DEVICE ENABLED IDENTIFICATION AND DISAMBIGUATION SYSTEM AND METHOD

BACKGROUND

Biometric authentication is increasingly being used for a variety of applications such as mobile banking, financial transactions, user authentication, national ID, and law enforcement. Biometric authentication is generally secure, but the need for biometric sensors and a way to store a user's biometric information may place limitations on implementation of biometric authentication. That may make it difficult to integrate biometric authentication into interactions that occur when groups of people are present, such as within a vehicle, especially shared vehicles, such as rental cars and ride sharing cars. In particular, current solutions that use a single biometric modality may not be able to disambiguate between multiple candidate users in a way that is both frictionless and highly secure.

Currently, a common way of completing an interaction while in a vehicle is with a smartphone. While smartphones may offer a wide range of capabilities, in order to access them, the user typically has to have their smartphone at hand. This can lead to dangerous distractions if, for example, the user is the driver of the vehicle. Hands-free systems, such as those offered by digital assistants like Google Assistant™ or Apple's Siri™, may not have the capability to perform authentication in an interaction and may further confuse the people within a group that may be speaking.

Vehicles themselves may have ways of facilitating interactions as well. However, these systems are often integrated into the vehicle itself. In particular, if biometric authentication is to be used, this may require that biometric capture devices be integrated into the vehicle. This may limit the scope of such an authentication system, especially in shared or rented vehicles.

Embodiments of the invention address these and other problems individually and collectively.

BRIEF SUMMARY

One embodiment of the invention includes receiving, by a server computer, interaction data regarding an interaction between a user associated with a communication device and an access device, the user being proximate to a plurality of candidate users at the time of the interaction. The method then includes determining, by the server computer, a plurality of match indicators, the plurality of match indicators generated by comparing a plurality of different sample biometric templates of the user with a plurality of different enrolled biometric templates, the plurality of different sample biometric templates comprising an image-based biometric template and a sample voice print biometric template, the plurality of different sample biometric templates obtained by a camera device proximate to the user. The method then includes identifying, by the server computer, the user based on at least the match indicator associated with the sample voice print biometric template. If the plurality of match indicators are positive match indicators, the method then includes initiating, by the server computer, a process on behalf of the user.

Another embodiment of the invention includes a server computer comprising: a processor; and a computer readable medium, coupled to the processor, for performing a method comprising: receiving interaction data regarding an interaction between a user operating a communication device and the access device, the user being proximate to a plurality of candidate users at the time of the interaction. The method then includes determining a plurality of match indicators, the plurality of match indicators generated by comparing a plurality of different sample biometric templates of the user with a plurality of different enrolled biometric templates, the plurality of different sample biometric templates comprising an image-based biometric template and a sample voice print biometric template, the plurality of different sample biometric templates obtained by a camera device proximate to the user. The method then includes identifying the user based on at least the match indicator associated with the sample voice print biometric template. If the plurality of match indicators are positive match indicators, the method then includes initiating a process on behalf of the user.

Another embodiment of the invention includes connecting, by a camera device, to one or more communication devices. The method then includes receiving, by the camera device, an indication to initiate an authentication process and capturing, by the camera device, a plurality of different sample biometric templates of a user that is proximate to a plurality of candidate users, and image based biometric templates of the candidate users, the plurality of different sample biometric templates comprising an image based biometric template and a sample voice print biometric template. The method then includes initiating generating a plurality of match indicators, the plurality of match indicators generated by comparing the plurality of different sample biometric templates of the user with a plurality of different enrolled biometric templates. If the plurality of match indicators are positive match indicators, a process is initiated on behalf of the user.

Further details regarding embodiments of the invention can be found in the Detailed Description and in the Figures.

DETAILED DESCRIPTION

Figure 1:
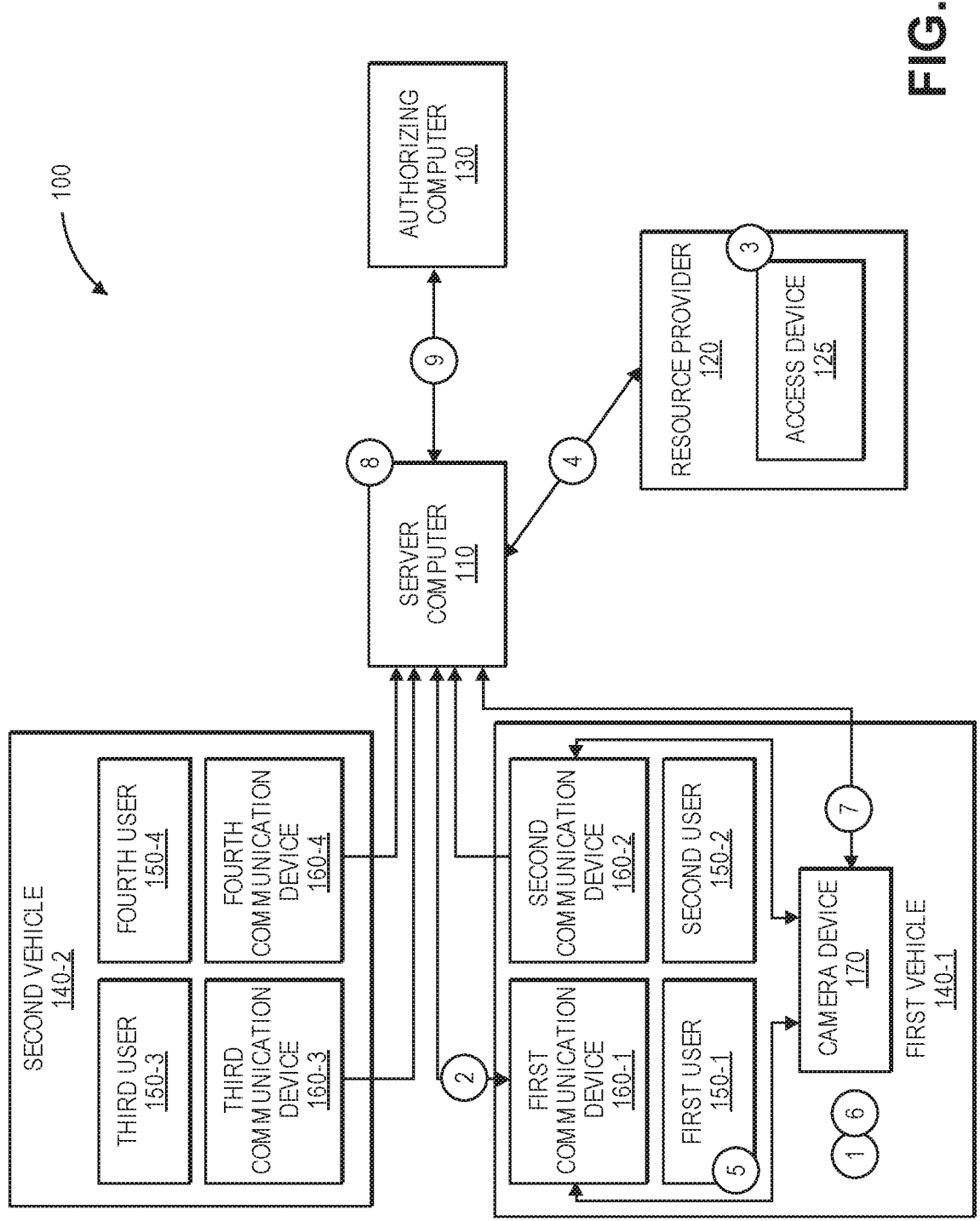
FIG. 1 shows a block diagram of a system and an interaction process flow according to embodiments.

Prior to discussing embodiments of the invention, some terms can be described in further detail.

A "user" may include an individual. In some embodiments, a user may be associated with one or more personal accounts and/or communication devices. In some embodiments, the user may be a cardholder, account holder, or consumer.

A "communication device" may be a device that is capable of transmitting a signal. The communication device can portable and able to be carried by a user. Communication devices may have capabilities for storing, processing, and transmitting information. Examples of a communication device may include a mobile phone, a tablet, a laptop computer, etc.

An "acquirer" may be a financial institution associated with a merchant. Acquirers typically provide merchants with a bank account, and in some cases, transaction accepting infrastructure. Generally, after a transaction has been authorized and as part of the settlement process, funds are transferred from the issuer to merchant's account at the acquirer. The acquirer may also communicate payment transaction status with the merchant. The acquirer may operate an acquirer computer, which may generically be a transport computer.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication). An issuer may also issue payment credentials stored on a user device, such as a cellular telephone, smart card, tablet, or laptop to the user.

A "payment processing network" may be data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services. In some cases, a resource provider can be a bank, if the bank dispenses a resource such as cash.

"Authentication data" may include any data suitable for authenticating a user or mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "card-on-file" transaction may be a transaction where a merchant uses payment credentials from a consumer that have been previously stored. A card-on-file transaction may also be called a credential-on-file transaction. A card-on-file transaction may be used, for example, for installment payments or for the convenience of the merchant or consumer.

A "key" may include a piece of information that is used in a cryptographic algorithm to transform data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "camera device" may be a device that may include a camera. In some embodiments, a camera device can include a "dashboard camera" or a "dash-cam." A dashboard camera may be mounted to the dashboard inside a vehicle. A dash-cam can also be mounted on or near the rear-view mirror with a view over the inside cabin of the vehicle. A camera device may also have Internet connectivity and the capability to provide a WiFi™ hotspot and/or Bluetooth™. A camera device can also include a microphone and/or a speaker. If the camera device is a dash-cam, then it may connect to the vehicle and may be able to make use of speakers of the vehicle.

A "biometric" may be any human characteristic that is unique to an individual. For example, a biometric may be a person's fingerprint, voice sample, face, DNA, iris, etc.

A "biometric reader" may include a device for capturing data from an individual's biometric sample. Examples of biometric readers may include fingerprint readers, front-facing cameras, microphones, and iris scanners.

A "biometric sample" or "biometric information" may include biometric data obtained by any type of input sensor. The data may be either an analog or digital representation of the user's biometric attributes, generated prior to determining distinct features needed for matching. For example, a biometric sample of a user's face may be image and/or depth data. In another example, a biometric sample of a user's voice may be audio data.

A "biometric template" or may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual. An enrolled biometric template may be a biometric template that is generated and saved prior to a biometric authentication process, to be used during the biometric authentication process. A sample biometric template may be a biometric template that is generated during a biometric authentication process.

The term "interaction" may be a reciprocal action, effect, or influence. An interaction, for example, could be an exchange or transaction between two or more parties. Examples of transactions can include payment transactions, data access transactions, and location access transactions.

FIG. 1 shows a system 100 comprising a number of components according to embodiments. The system 100 may comprise a server computer 110, a resource provider 120, which may operate an access device 125, an authorizing computer 130, one or more vehicles 140-1, 140-2, one or more users 150-1, 150-2, 150-3, 150-4, who may be associated with one or more communication devices 160-1, 160-2, 160-3, 160-4, and one or more camera devices 170. The components of the system 100 may all be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The server computer 110 may be configured to receive information from other devices in the system 100. The server computer 110 may store biometric templates in a database. The server computer 110 may also store location data in the database.

The resource provider 120 may be an entity that has control over a particular resource. The resource provider 120 may be, for example, a merchant, a bank, a government entity, or a transit authority. The resource provider 120 may operate a resource provider computer.

The access device 125 may be a device configured to manage access to a particular resource. The access device 125 may be operated by the resource provider 120. In some embodiments, the access device 125 may be a point of sale (POS) terminal or an automated teller machine (ATM). As another example, the access device 125 may control access to a secure area, such as by a gate. In some embodiments, the access device 125 may have a location determination system, such as a GPS device. Additionally, or alternatively, the access device 125 may be in a permanent or semi-permanent location and have stored location data about its location.

The authorizing computer 130 may be configured to authorize any suitable request, including access to data, access to a location, or approval for a payment. The authorizing computer 130 may receive interaction data from the server computer 110. The authorizing computer 130 may also receive an indicator that the interaction, a user associated with the interaction, and/or a communication device associated with the interaction is authenticated. In some embodiments, the authorizing computer 130 may be operated by an account issuer. Typically, the issuer is an entity (e.g., a bank) that issues and maintains an account of a user. The account may be a credit, debit, prepaid, or any other type of account.

The vehicles in FIG. 1 may include a first vehicle 140-1 and a second vehicle 140-2, and such vehicles may be personal or commercial vehicles. They can be cars, trucks, etc. In some embodiments, the either the first vehicle 140-1 and/or second vehicle 104B, may be a rental car. In another embodiment it may be a car driven as part of a rideshare system, such as Uber or Lyft. The vehicle may or may not have network connectivity and/or a digital UI. Although two vehicles are illustrated in FIG. 1, any number of vehicles may be present in embodiments.

Figure 5:
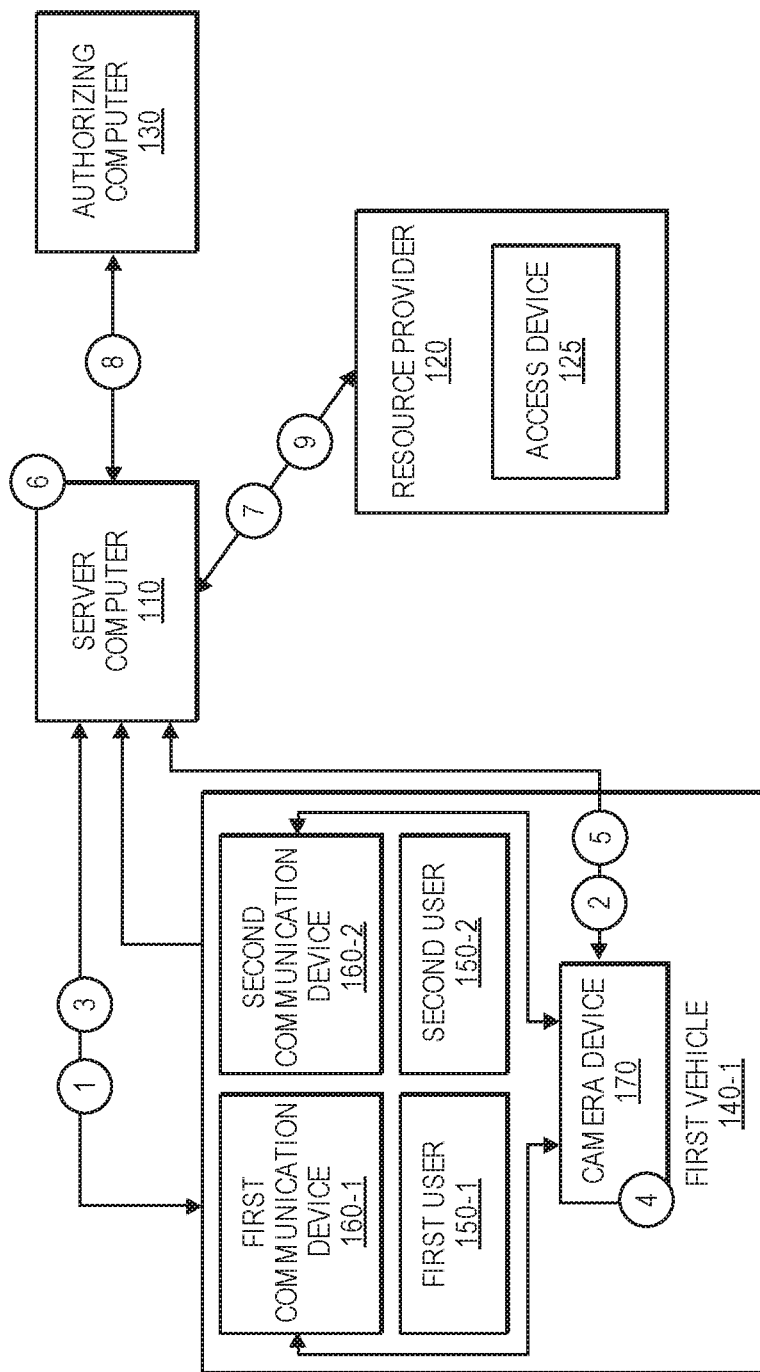
FIG. 5 shows a block diagram of a system and another interaction process flow according to embodiments

The users 150-1, 150-2, 150-3, 150-4 may be individuals. In FIG. 5, the first vehicle 140-1 may have a first user 150-1 and a second user 150-2. The first user 150-1 may operate a first communication device 160-1, and the second user 150-2 may operate a second communication device 160-2. The first user 150-1 or the second user 150-2 may operate the first vehicle 140-1. The second vehicle 140-2 may have a third user 150-3 and a fourth user 150-4. The third user 150-3 may operate a third communication device 160-3, and the fourth user 150-4 may operate a fourth communication device 160-4.

The communication devices 160-1, 160-2, 160-3, 160-4 may be portable devices that can transmit signals to other devices. In some embodiments, the communication devices 160 may be mobile phones. The communication devices 160-1, 160-2, 160-3, 160-4 may each optionally have a secure storage element. In some embodiments, a communication device associated with a user may not be inside a vehicle with the user and/or may not be proximate to the user. For example, in some embodiments, a communication device associated with the user may be at the home of the user, while the user is operating a vehicle.

The camera device 170 in FIG. 1 may only be in the first vehicle 140-1 in this example, and may be a device with a camera and a microphone. The camera device 170 may be portable and may be able to be removed from the vehicle 140. The camera device 170 may also have one or more biometric capture devices in addition to a camera. In some embodiments, the camera device 170 may be a dashboard camera (dash-cam).

For simplicity of illustration, a certain number of components are shown in FIG. 1. It is understood, however, that embodiments of the invention may include more than one of each component. In addition, some embodiments of the invention may include fewer than or more than all of the components shown in FIG. 1. For example, embodiments of the invention may have only one user 150 and one communication device 160.

Figure 2:
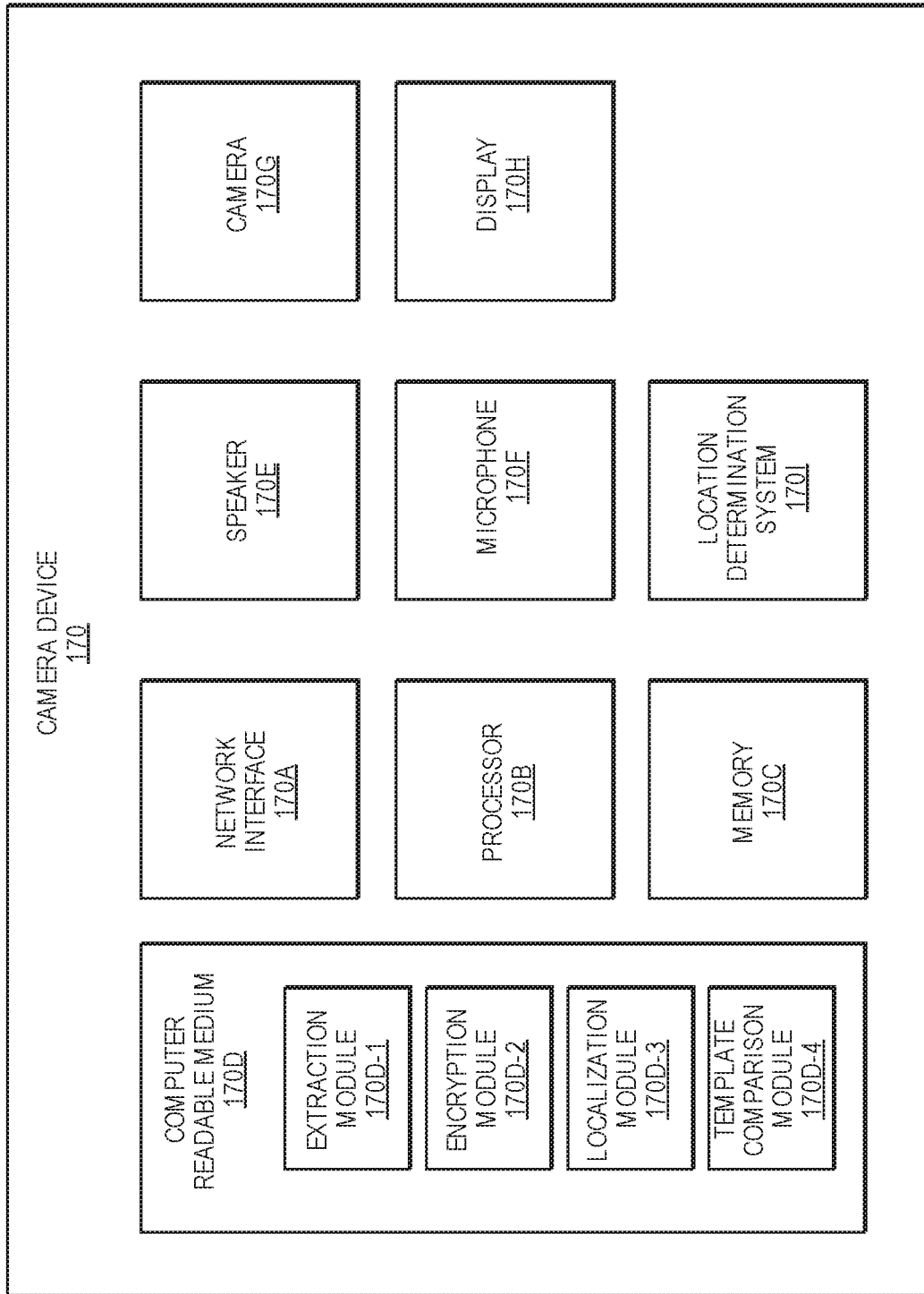
FIG. 2 shows a block diagram of a dashboard camera according to embodiments.

One embodiment of the camera device 170 is shown in more detail in a block diagram in FIG. 2. The camera device 170 may comprise a processor 170B, a network interface 170A, and a memory 170C. The camera device 170 may also include a computer readable medium 170D, which may comprise code, executable by the processor for implementing methods according to embodiments. The computer readable medium 170D may contain an extraction module 170D-1, an encryption module 170D-2, a localization module 170D-3, and a template comparison module 170D-4. The camera device 170 may also comprise a speaker 170E, a microphone 170F, a camera 170G, a display 170H, and a location determination system 170I.

The extraction module 170D-1, in conjunction with the processor 1706, can extract information from data collected by the camera device 170. The extraction module 170D-1, in conjunction with the processor 1706, may then derive one or more biometric sample templates from a biometric sample. For example, the camera 170G may capture an image of one or more users 150. The extraction module 170D-1, in conjunction with the processor 170B, may derive a facial scan biometric sample template from each of the users 150 in the image. Derivation may include identifying features (e.g., eyes, nose) and extracting data based on the features. The extraction module 170D-1, in conjunction with the processor 1706, may also extract interaction data. For example, the microphone 170F may record a user 150 speaking a sentence with information about an interaction, such as a transaction value. The extraction module 170D-1, in conjunction with the processor 1706, may identify the interaction data and extract the transaction value from the recording.

The encryption module 170D-2, in conjunction with the processor 170B, may encrypt data. In some embodiments, the encryption module 170D-2, in conjunction with the processor 170B, may encrypt biometric sample templates. For example, the encryption module 170D-2, in conjunction with the processor 170B, may encrypt a facial scan that was derived from an image taken by camera 170G. In some embodiments, the encryption module 170D-2 may use a public key of a public key/private key pair, or may use a symmetric key of a cryptographic key pair. Any suitable encryption process or algorithm may be used by the encryption module 170D-2. For example, the encryption module 170D-2 may use a DES, triple DES, AES, etc. encryption process.

The localization module 170D-3, in conjunction with the processor 170B, may determine a location of the camera device 170, using information from the location determination system 170I. In some embodiments, the localization module 170D-3, in conjunction with the processor 170B, may use geofencing and location information from the location determination system 170I to determine when the camera device 170 is near an access devices and transmit location data when it is within range of an access device. The localization module 170D-3 may have a list of locations of access devices, and thus the localization module 170D-3, in conjunction with the processor 170B, may determine when the camera device 170 is near an access device.

The template comparison module 170D-4, in conjunction with the processor 170B, may compare a sample biometric template to an enrolled biometric template. The template comparison module 170D-4, in conjunction with the processor 1706, may generate one or more match indicators based on the results of the template comparison. For example, the template comparison module 170D-4, in conjunction with the processor 1706, may generate a positive match indicator if a sample facial scan biometric template derived from an image taken by the camera 170G is similar to an enrolled facial scan biometric template (i.e., within a threshold). The template comparison module 170D-4, in conjunction with the processor 170B, may generate a negative match indicator if the sample facial scan biometric template is not similar to the enrolled biometric template.

In some embodiments, the sample biometric template and/or the enrolled biometric template may be encrypted during the template comparison process. For example, the template comparison may then be performed using secure multiparty computation (SMPC) and/or homomorphic encryption. SMPC allows a plurality of devices to compute a function of data, even if the data is encrypted. The camera device 170 may receive an encrypted enrolled biometric template, for example, from communication device 160-1. The template comparison module 170D-4, in conjunction with the processor 170B, may compute the comparison between the encrypted enrolled biometric template and the sample biometric template, resulting in an encrypted match indicator. The encrypted match indicator may then be sent to the communication device 160-1, which may then decrypt the encrypted match indicator.

The location determination system 170I may determine a location of the camera device 170. The location determination system 170I may comprise a GPS receiver or any other suitable location determination mechanism. The location determination system 170I may periodically transmit location information to external systems, for example, every 3 minutes. The frequency of location updates may depend on proximity to certain devices. For example, the location determination system 1701 may determine the location once every 3 minutes when more than 1 mile away from an access device 125, and determine the location once every 30 seconds when within 1 mile of the access device 125. The location determination system 1701 may also send location data to the localization module 170D-3.

Figure 3:
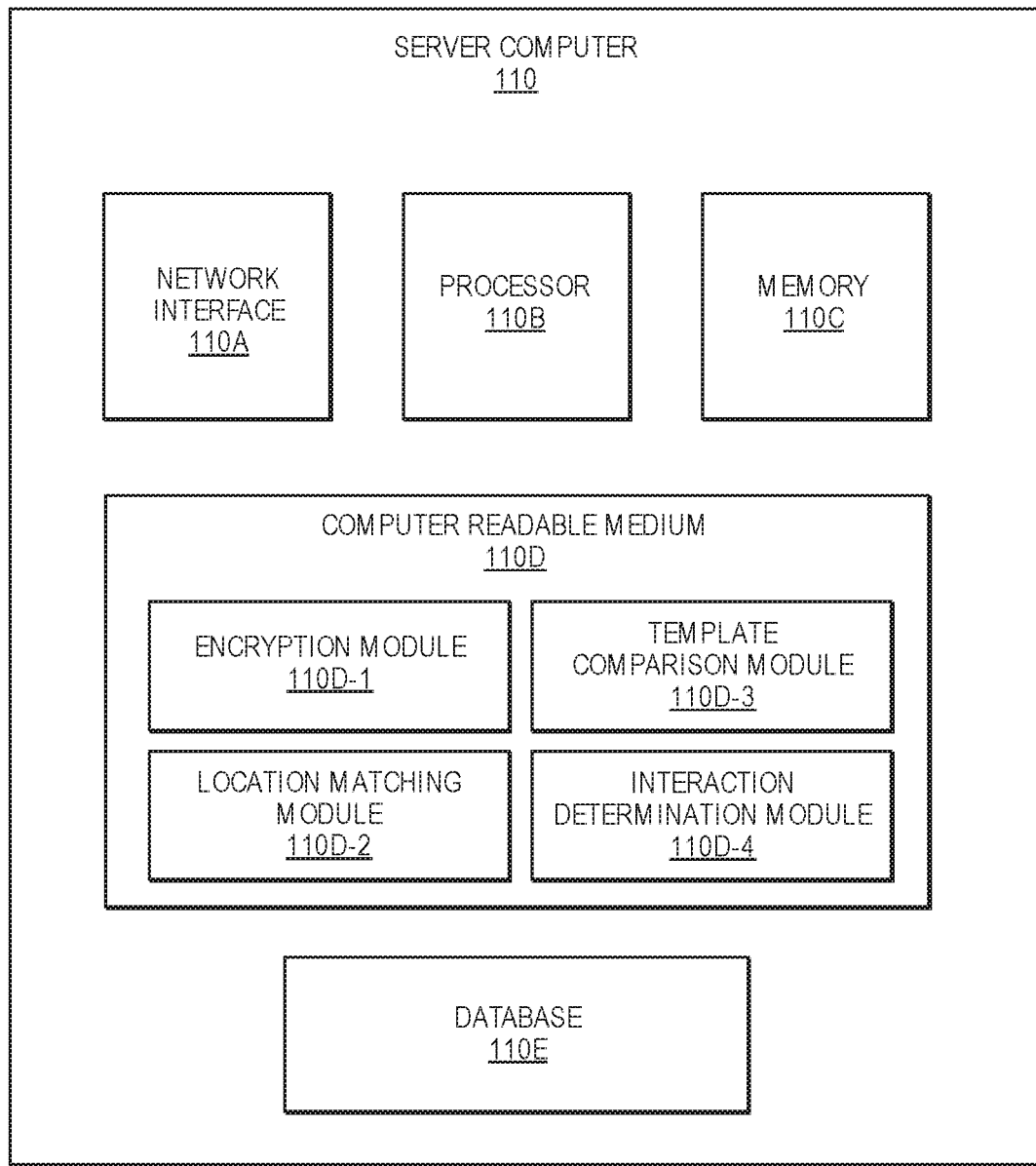
FIG. 3 shows a block diagram of a server computer according to embodiments.

One embodiment of the server computer 110 is shown in more detail in a block diagram in FIG. 3. The server computer 110 may comprise a processor 110G, a network interface 110A, and a memory 110C. The server computer 110 may also include a computer readable medium 110D, which may comprise code, executable by the processor for implementing methods according to embodiments. The computer readable medium 110D may contain an encryption module 110D-1, a location matching module 110D-2, a template comparison module 110D-3, and an interaction determination module 110D-4. The server computer 110 may also comprise a database 110E. The database 110E may include any suitable information including encrypted or plain-text enrolled biometric templates. Device identifiers, user information, and cryptographic keys associated with the same may be stored in the database as well. Further, access credentials such as access badge identifiers, tickets, and payment credentials (e.g., PANs or tokens) may also be stored in the database 110E. Other information such as resource provider identifiers, time stamps, interaction data, and other information may also be stored in the database 110E.

The encryption module 110D-1 may have similar or different characteristics as the encryption module 170D-2 in FIG. 2.

The location matching module 110D-2, in conjunction with the processor 110G, may compare location data (e.g., latitude and longitude, signal strength data, IP address data) received from devices in system 100. In some embodiments, the server computer 110 may receive location information from one or more access devices 125, one or more communication devices 160, and/or one or more camera devices 170. The location matching module 110D-2, in conjunction with the processor 110G, may then determine which devices are proximate to each other. For example, the server computer 110 may receive location information (e.g., GPS coordinates) from an access device and three communication devices. The location matching module 110D-2, in conjunction with the processor 110G, may compare the location of each of the communication devices to the location of the access device and determine one or more of the communication devices are within a predetermined distance (e.g., 50 meters) of the access device. Additionally, or alternatively, location data may be stored in a database (not shown). The location matching module 110D-2, in conjunction with the processor 110G, may query the database to determine one or more devices proximate to a device. For example, the server computer 110 may receive location data (e.g., GPS coordinates) from a communication device. The location matching module 110D-2, in conjunction with the processor 110G, may then query a database of access device location data. The location matching module 110D-2, in conjunction with the processor 110G, may then receive from the database the location of an access device that is closest to the communication device.

The template comparison module 110D-3, in conjunction with the processor 110G, may compare a sample biometric template to an enrolled biometric template. The template comparison module 110D-3, in conjunction with the processor 110G, may generate one or more match indicators based on the results of the template comparison. For example, the template comparison module 110D-3, in conjunction with the processor 110G, may generate a positive match indicator if a sample facial scan biometric template derived from an image is similar to an enrolled facial scan biometric template (e.g., within a predetermined threshold of similarity). The template comparison module 110D-3, in conjunction with the processor 110G, may generate a negative match indicator if the sample facial scan biometric template is not similar to the enrolled facial scan biometric template. Additionally, or alternatively, the template comparison module 110D-3, in conjunction with the processor 110G, may receive one or more match indicators from other devices.

In some embodiments, the sample biometric template and/or the enrolled biometric template may be encrypted during the comparison process. The template comparison may then be performed using SMPC. The server computer 110 may receive an encrypted enrolled biometric template, for example, from a communication device. The template comparison module 110D-3, in conjunction with the processor 110G, may compute the comparison between the encrypted enrolled biometric template and the sample biometric template, resulting in an encrypted match indicator. The encrypted match indicator may then be sent to the communication device 160-1, which may then decrypt the encrypted match indicator.

The interaction determination module 110D-4, in conjunction with the processor 110G, may identify an interaction associated with an authentication process. The server computer 110 may receive interaction data from one or more access devices. The server computer 110 may also receive interaction data from one or more communication devices and/or camera devices. Interaction data may include a resource provider identifier, a transaction value, and/or a timestamp. The interaction determination module 110D-4, in conjunction with the processor 110G, may use the interaction data to determine the communication devices and/or camera devices that are involved in the interaction with a particular access device. For example, the server computer 110 may receive information from a particular access device about an interaction with resource provider A with a transaction value of $10. The server computer 110 may also receive information from a particular camera device about an interaction with resource provider A with a transaction value of $10. The interaction determination module 110D-4, in conjunction with the processor 110G, may then determine that the particular camera device is involved in an interaction with the particular access device.

In some embodiments, interaction determination may additionally, or alternatively, be performed with information from the location matching module. For example, the location matching module 110D-2, in conjunction with the processor 110G, may determine that there are two camera devices proximate to a particular access device. The interaction determination module 110D-4, in conjunction with the processor 110G, may then only compare interaction data received from the access device to interaction data from the two camera devices, as it is likely that the access device is involved in an interaction with devices that are nearby.

Figure 4:
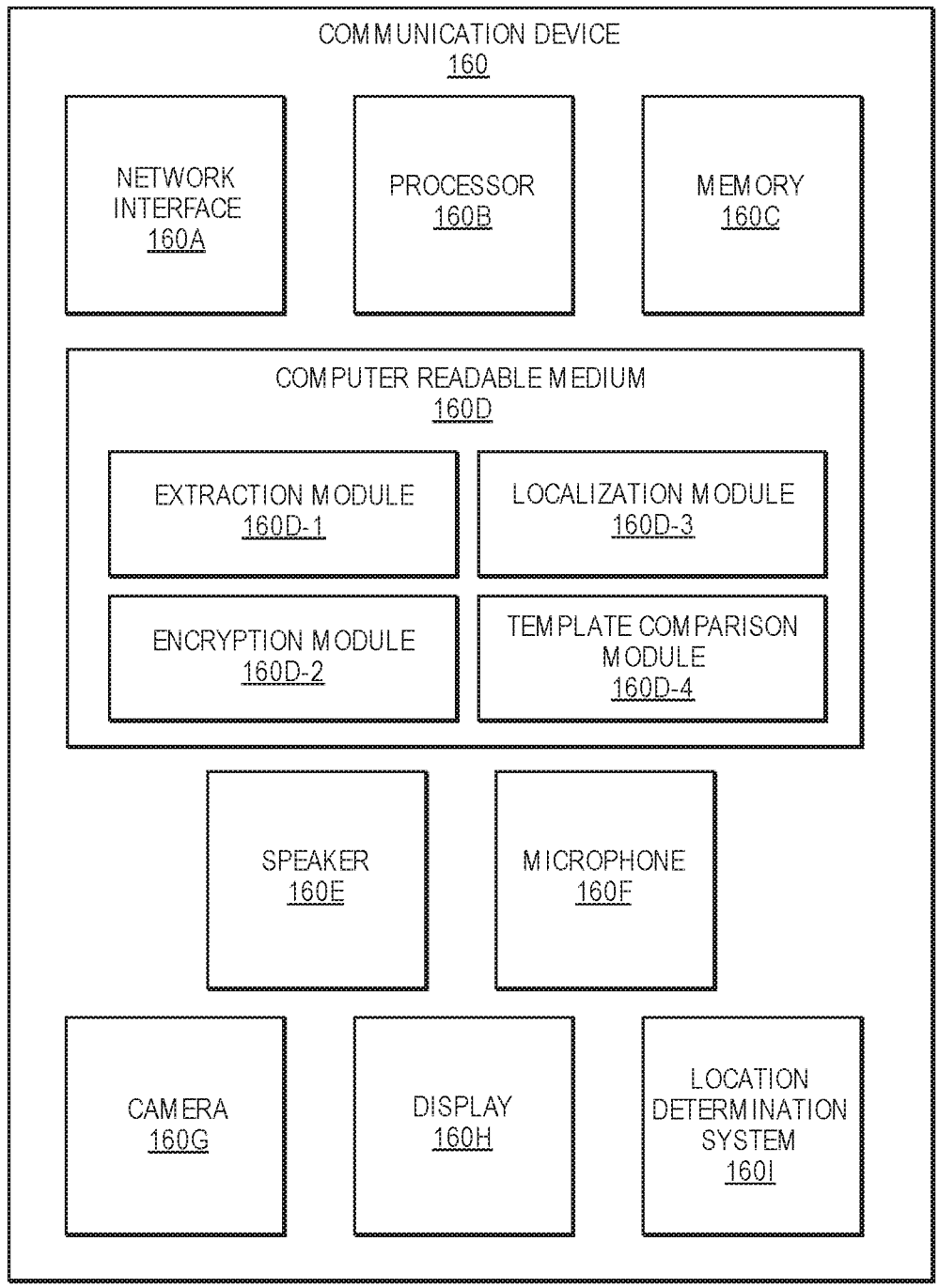
FIG. 4 shows a block diagram of a communication device according to embodiments.

One embodiment of a communication device 160 is shown in more detail in a block diagram in FIG. 4. The communication device 160 may comprise a processor 160B, a network interface 160A, and a memory 160C. The communication device 160 may also include a computer readable medium 160D, which may comprise code, executable by the processor for implementing methods according to embodiments. The computer readable medium 160D may contain an extraction module 160D-1, an encryption module 160D-2, a localization module 160D-3, and a template comparison module 160D-4. The communication device 160 may also comprise a speaker 160E, a microphone 160F, a camera 160G, a display 160H, and a location determination system 160I. In some embodiments, the communication device 160 may be a mobile phone.

The extraction module 160D-1, in conjunction with the processor 160B, can extract information from data collected by the communication device 160. The extraction module 160D-1, in conjunction with the processor 160B, may derive one or more enrolled biometric templates from a biometric sample. For example, the camera 160G may capture an image of a user 150. The extraction module 160D-1, in conjunction with the processor 160B, may derive a facial scan biometric template from the user 150 in the image. Derivation may include identifying features (e.g., eyes, nose) and extracting data based on the features. The biometric template may then be stored as an enrolled biometric template in the memory 160C.

The encryption module 160D-2, can have the same or different characteristics as the encryption module 170D-2 in FIG. 2.

The localization module 160D-3, in conjunction with the processor 160B, may determine a location of the communication device 160, using information from the location determination system 160I. In some embodiments, the localization module 160D-3, in conjunction with the processor 160B, may use geofencing and location information from the location determination system 160I to determine when the communication device 160 is near an access devices and transmit location data when within range of an access device. The localization module 160D-3 may have a list of locations of access devices, and thus the localization module 160D-3, in conjunction with the processor 160B, may determine when the communication device 160 is near an access device.

The template comparison module 160D-4, in conjunction with the processor 160B, may compare a sample biometric template to an enrolled biometric template. The template comparison module 160D-4, in conjunction with the processor 160B, may generate one or more match indicators based on the results of the template comparison. For example, the template comparison module 160D-4, in conjunction with the processor 160B, may generate a positive match indicator if a sample facial scan biometric template derived from an image is similar to an enrolled facial scan biometric template (e.g., within a predetermined threshold of similarity). The template comparison module 160D-4, in conjunction with the processor 160B, may generate a negative match indicator if the sample facial scan biometric template is not similar to the enrolled biometric template. The template comparison module 160D-4 may also have characteristics similar to the template comparison module 170D-4 in FIG. 2.

The location determination system 160I may have the same or different characteristics as the location determination system 170I in FIG. 2.

Returning to FIG. 1, an interaction flow can be described. The interaction flow may be illustrated in the context of at least two vehicles including the first vehicle 140-1 and the second vehicle 140-2 being present a resource provider 120 such as a restaurant with drive through service. The access device 125 may be a POS terminal operated by a restaurant employee at a drive through lane of the restaurant. In this example, camera device 170 may be a dashboard camera. The first, second, third, and fourth communication devices 160-1, 160-2, 160-3, and 160-4 may all be smart phones containing previously-enrolled biometric templates of the first, second, third, and fourth users 150-1, 150-2, 150-3, 150-4, respectively. The second, third, and fourth users 150-2, 150-3, 150-4 may be candidate users proximate to the first user 150-1.

During a prior enrollment process, each of the first, second, third, and fourth communication device 160-1, 160-2, 160-3, 160-4 may have generated and encrypted a plurality of different biometric templates from biometric information of its respective user 150-1, 150-2, 150-3, 150-4. For example, each communication device 160-1, 160-2, 160-3, 160-4 may obtain, generate, and encrypt a biometric template from at least two of an iris scan, a voice print, a fingerprint, a heartbeat, etc. Each of the first, second, third and fourth communication device 160-1, 160-2, 160-3, 160-4 may have then transmitted the plurality of different encrypted biometric templates to the server computer 110 for enrollment. Alternatively or additionally, each communication device 160-1, 160-2, 160-3, 160-4 can send an indicator to the server computer 110 that the communication device 160-1, 160-2, 160-3, 160-4 has an encrypted enrolled biometric template stored within it. Exemplary enrollment processes are described in further detail in FIG. 6.

Referring to FIG. 1, in step 1, the first and second communication devices 160-1, 160-2 may connect to the camera device 170 in the first vehicle 140-1. They may connect to the camera device 170, for example, using Bluetooth™ or WiFi™. The first and second communication devices 160-1, 160-2 may also each send a communication device identifier to the camera device 170 in embodiments. Note that the third communication device 160-3 and the fourth communication device 160-4 are not in communication with the camera device 170 as they are not close enough to it to receive or transmit signals to or from the camera device 170.

In step 2, each of the first, second, third, and fourth communication devices 160-1, 160-2, 160-3, and 160-4 may send periodic location updates to the server computer 110. For example, a location update may be sent by each of the first, second, third, and fourth communication devices 160-1, 160-2, 160-3, and 160-4 every few minutes (e.g., every 3 minutes). The location update from each of the first, second, third, or fourth communication devices 160-1, 160-2, 160-3, and 160-4 may comprise its location and its communication device identifier.

In step 3, a first user 150-1 may initiate an interaction with resource provider 120, through access device 125. For example, the first user 150-1 may be purchasing food from the resource provider 120. The first user 150-1 may indicate that they wish to complete the interaction with the camera device 170. For example, the first user 150-1 may indicate this by informing an operator of the access device 125. The first user 150-1 may tell an employee at the access device 125 (e.g., a POS terminal) that the first user 150-1 would like to pay with the camera device 170. The operator may then input an indication of the user's intent to the access device 125. Additionally, or alternatively, the first user 150-1 may press a button on the access device 125 to indicate their desire to pay with the camera device 170. After the access device 125 has received the indication that the first user 150-1 wants to pay with the camera device 170, the access device 125 may then optionally send interaction data for the current interaction between the first user 150-1 and the resource provider 120 to a computer of the resource provider 120, before it is provided to the server computer 110. The interaction data may comprise any suitable information, including an indicator that the interaction will be completed with a camera device, a transaction value, a resource provider identifier, a timestamp, or any other suitable data. The interaction data received from the access device 125 may be used by the server computer 110 to identify a corresponding communication from the first communication device 160-1 from among other communications from the second, third, and fourth communication devices 160-2, 160-3, 160-4.

In step 4, the computer of the resource provider 120 may send a request message to the server computer 110. In some embodiments, the request message may comprise the interaction data (e.g., the transaction value), a resource provider identifier (e.g., a merchant identifier or an access device identifier), and a location of the access device 125.

In step 5, the first user 150-1 may say a predetermined phrase or sentence, which may be recognizable by the camera device 170, to begin interacting with the camera device 170. For example, if the camera device 170 is a dashboard camera, the first user 150-1 may state "Hey, dash-cam, this is John Smith. Please pay order 73 of $10.05 for hamburgers and fries at Burger Joint." In this example, the phrase "Hey, dash cam . . . " can activate the camera device 170 so that it is ready to receive and analyze data. As noted above, the sentence uttered by the first user 150-1 may also include interaction data (e.g., the name of the resource provider 120, the order number, and the transaction value) and/or identifying information about the user 150-1 (e.g., the user's name). More specifically, the predetermined phrase or sentence may trigger the camera device 170 to activate and begin recording. From the recording, the camera device 170 may derive a sample voice print biometric template. As noted above, the camera device 170 may also extract the interaction data and/or identifying information from the recording. The predetermined phrase or sentence received by the camera device 170 may also trigger the camera device 170 to take a picture of the interior of vehicle 140-1, and may include images of the first user 150-1 and the second user 150-2. The images of the third user 150-3 and the fourth user 150-4 are not taken by the camera device 170, since they are present in the second vehicle 140-2 and not the first vehicle 140-1. The camera device 170 may then derive image-based biometric templates, such as sample facial scan biometric templates of the first user 150-1 and the second user 150-2 from the picture taken by the camera device 170.

In some embodiments, the camera device 170 may prompt the first user 150-1 to provide missing information (e.g., audio prompts through speakers 170E or visual prompts on display 170H) if the camera device 170 has not received complete information.

In some embodiments, some of the information may be spoken by entities other than the first user 150-1. For example, the interaction data may be spoken by the operator of the access device 125.

In step 6, the predetermined phrase or sentence may also trigger or activate the first communication device 160-1. In this regard, the first communication device 160-1 may contain an application (i.e., an "app") which is programmed to cause the first communication device 160-1 to activate upon receiving the predetermined phrase or sentence. The first communication device 160-1 may then transmit a message to the camera device 170, the message comprising the identifier of the first communication device 160-1. In some embodiments, the first and second communication devices 160-1 and 160-2 may be configured so that the predetermined phrase or sentence only activates the first communication device 160-1 when spoken by the first user 150-1. However, it may be that both of the first and second communication devices 160-1, 160-2 in the first vehicle 140-1 are triggered after receiving the predetermined phase or sentence. In this case, both the first communication device 160-1 and the second communication device 160-2 may send their communication device identifiers (e.g., phone numbers, IMEI numbers, SIM card numbers, etc.) to the camera device 170.

In step 7, once the camera device 170 has received data from the first communication device 160-1 and optionally the second communication device 160-2, the camera device 170 may send a message including any received data, data derived therefrom, or other data to the server computer 110. The message may be sent to the server computer 110, without passing through the access device 125 or the resource provider 120.

The message that is sent from the camera device 170 to the server computer 110 can include different types of biometric data from one or more communication devices in proximity to the camera device 170. For example, in some embodiments, the message may comprise the sample facial scan biometric templates of first and second users 150-1, 150-2, and the sample voice print biometric template of first user 150-1. In some embodiments, the sample biometric templates that are sent by the first communication device 160-1, and optionally the second communication device 160-2, may be encrypted before they are sent to the server computer 110.

The message may also comprise interaction data and/or identifying information (e.g., a transaction amount, name of the first user 150-1, resource provider identifier, a timestamp, etc.) extracted from the recording of user 150-1 or from the first communication device 160-1 itself. In some embodiments, the message may also comprise the identifier of first communication device 160-1. If both of the first and the second communication devices 160-1, 160-2 send their identifiers to the camera device 170, the message may comprise both of the identifiers for the first and the second communication devices 160-1, 160-2.

In step 8, after receiving the message from the camera device 170, the server computer 110 may then analyze the message, and may then proceed to identify the first user 150-1 and the particular interaction. In some embodiments, identification of the user 150-1 may be done using a plurality of different biometric templates. The server computer 110 may receive the facial scan biometric templates from the first user 150-1 and the other candidate users 150-2, 150-3, 150-4. The server computer 110 can then match the sample biometric templates received from the camera device to enrolled biometric templates of users proximate to the communication device 125, including the first user 150-1 and candidate users 150-2, 150-3, 150-4. As only the first user 150-1 and the second user 150-2 are in the first vehicle 140-1, the camera device may have sent sample facial scan biometric templates of those two users. The server computer 110 may thus only generate positive match indicators associated with sample facial scan biometric templates of the first user 150-1 and the second user 150-2. In this way the server computer 110 may restrict the number of candidate users. The server computer 110 may then match the sample voice print biometric template to the enrolled voice print biometric templates of the first user 150-1 and the second user 150-2. The server computer 110 may then generate a positive match indicator associated with the sample voice print biometric template of the first user 150-1, and identify the first user 150-1.

In some embodiments, user identification and/or interaction identification can include a number of steps involving location data and interaction data. For example, the server computer 110 may compare the location of the access device 125, received from the access device 125 in step 4, to the locations of the first, second, third, and fourth communication devices 160-1, 160-2, 160-3, 160-4. The server computer 110 may determine the distances between the first, second, third, and fourth communication devices 160-1, 160-2, 160-3, 160-4, and the access device 125 to determine if the access device 125 is within a predetermined distance threshold of the between the first, second, third, and fourth communication devices 160-1, 160-2, 160-3, 160-4 (e.g., 30 feet), and other communication devices that are enrolled with the server computer 110. The server computer 110 may then retrieve the communication device identifiers associated with the location data of the first, second, third, and fourth communication devices 160-1, 160-2, 160-3, 160-4, that are close to the access device 125. For example, the server computer 110 may determine that the first and second communication devices 160-1, 160-2 are within a predetermined range of the access device 125, and that the third and fourth communication devices 160-3, 160-4 are not within the predetermined range. The server computer 110 may perform the location comparison periodically to maintain an updated record of devices that are within range of the access device 125. This can be done before a particular interaction is initiated. Once the server computer 110 has determined that which communication devices are located proximate to the access device 125, then it may perform a biometric match process for the current interaction between the resource provider 120 and the first user 150-1.

The server computer 110 may also use interaction data to match the camera device 170 to the access device 125, as part of the authentication process. The server computer 110 may do this using the interaction determination module 110D-4. For example, there may be multiple pending interactions at access device 125, each with a different timestamp and transaction value. The server computer 110 may then compare a first timestamp of the interaction data and the transaction value received from the camera device 170 with a second timestamp and transaction information received from the access device 125. Using this information, the server computer 110 may then match the messages received from the camera device 170 and the access device 125. For example, the message from the camera device 170 may include a first timestamp of 10:01 am and a transaction amount of $10.05, while the message from the access device 125 may include a timestamp of 10:02 am and $10.05. The server computer 110 may receive these messages and may then determine that the two messages are linked to the same interaction.

In some embodiments, the server computer 110 may use the communication device identifier received from camera device 170 to identify the first communication device 160-1 that is in communication with the camera device 170. The server computer 110 may then determine that the first user 150-1 is completing the interaction. The server computer 110 may also use the identifying information from the camera device 170 to also identify the first user 150-1. For example, the user 150-1 may have stated their name (e.g., "John Smith") in the predetermined phrase or sentence to the camera device 170, and this name may have been received by the server computer 110. In some cases, this may be sufficient to complete the authentication of the first user 150-1, and the process could to proceed to an authorization process as in step 9. Interactions with particular resource providers or interactions that may involve transaction values greater than a predetermined threshold may require that a biometric authentication be performed. For example, a biometric authentication process may not be needed if the transaction is less than $5.00. In such a case, the value of the interaction may be so low that further authentication may slow down the interaction process. However, in embodiments, when additional authentication is desired, the server computer 110 may proceed with biometric authentication.

In step 8, the server computer 110 may perform a biometric authentication process. The biometric authentication process may be performed as part of user identification. Additionally, or alternatively, the biometric authentication process may be performed with the first communication device 160-1 being identified (as explained above) as the communication device of the first user 150-1. The server computer 110 may retrieve an enrolled voice print biometric template from a database 110E and the sample voice print biometric template to authenticate the user. The database 110E may include any suitable information including encrypted or plain-text enrolled biometric templates. Device identifiers, user information, and cryptographic keys associated with the same may be stored in the database as well. Further, access credentials such as access badge identifiers, tickets, and payment credentials (e.g., PANs or tokens) may also be stored in the database 110E.

As noted above, the different biometric templates from users 150-1, 150-2 may be encrypted when they are received by the server computer 110. In some embodiments, the server computer 110 may decrypt the encrypted different biometric templates using a corresponding key(s) of a cryptographic key pair shared with the first communication device 160-1 and/or the second communication device 160-2. A private key may be used if public-private key encryption was used to decrypt an encrypted biometric template, or a symmetric key may be used if symmetric encryption was used to encrypt the particular biometric template. In some embodiments, the server computer 110 may look up corresponding keys after determining the communication devices involved in the current interaction. The server computer 110 may then attempt to decrypt the encrypted different biometric templates using the retrieved cryptographic keys. Once the encrypted different biometric templates are decrypted, they may be compared to the enrolled different biometric templates stored in the database 110E that are associated with the device identifiers of the first communication device 160-1 and optionally the second communication device 160-2.

In some embodiments, biometric authentication may occur in the encrypted domain or otherwise in a manner that does not involve the comparison of plain-text biometric templates. That is, the comparison of biometric templates may occur when the biometric templates are encrypted or are in separate machines, and the comparison may result in an encrypted match indicator. In the former case, the match indicator may then be decrypted with an appropriate cryptographic key to determine if the compared biometric templates match or don't match. With this in mind, embodiments may use utilize homomorphic encryption techniques or SMPC (secure multi-party computation).

Homomorphic secret sharing may be a type of sharing algorithm in which the secret is encrypted using homomorphic encryption. Homomorphic encryption may be a form of encryption that allows computation on ciphertexts, and generates an encrypted result which, when decrypted, matches the result of the computations as if they had been performed on the plaintext. Homomorphic encryption may be described in more detail in Armknecht, Frederik, et al. "A Guide to Fully Homomorphic Encryption." *IACR Cryptology ePrint Archive* 2015 (2015): 1192, hereby incorporated by reference.

Other methods of encrypting may be through the use of secure multi-party computation. Secure multi-party computation may include techniques such as Yao based protocols, oblivious transfer, etc. The use of garbled circuits are explained by "*How to generate and exchange secrets,*" *Foundations of Computer Science*, 1986, 27th Annual Symposium on. *IEEE*: 162-167 which is hereby incorporated by reference.

In an SMPC process, the server computer 110 may communicate with the identified first communication device 160-1 to complete the biometric authentication process. For example, the server computer 110 may use an enrolled facial scan biometric template and compare it to a sample biometric template that is stored on the first communication device 160-1. The SMPC process may generate an encrypted match indicator, which may indicate whether or not the enrolled biometric template matches the sample biometric template.

In other embodiments, the server computer 110 and the first communication device 160-1 may perform a homomorphic encryption process. The server computer 110 may compare received encrypted biometric templates with stored encrypted enrolled biometric templates and may determine a match indicator that is also encrypted. The encrypted match indicator can be sent by the server computer 110 to the communication device 160-1 to be decrypted, and then forwarded to the server computer 110. The server computer 110 may then receive the decrypted match indicator and may evaluate it to determine if the first user 150-1 is or is not authenticated. The biometric matching process can be performed on each biometric template of each type received by the server computer 110. For example, if the first user 150-1 was previously identified, the server computer 110 may compare an enrolled facial scan biometric template with a current facial scan biometric template, and may also compare an enrolled voice print biometric template with a current voice print biometric template to authenticate the first user 150-1 associated with the first communication device 160-1. The server computer 110 may then attempt to complete the biometric authentication process with the communication device 160-1 until it receives positive match indicators for at least two different types of biometric samples from the camera device 170.

In step 9, after the server computer 110 has identified and authenticated the first user 150-1, the server computer 110 may initiate a process on behalf of the first user 150-1. Any suitable process may be performed once the first user 150-1 is authenticated. For example, in some embodiments, an authorization process such as a payment authorization process, a data access authorization process, or a location access process may be performed.

In some embodiments, once the first user 150-1 has been identified and authenticated, the server computer 110 may retrieve stored credentials of the first user 150-1. The server computer 110 may retrieve the credentials by querying a database of credentials 110E with the identifier of the communication device 160-1. The stored credentials may be payment credentials. In some embodiments, the process may be a card-on-file transaction. For example, once the first user 150-1 is identified, then access credentials such as an access badge number, a payment token, a primary account number (PAN) and expiration date, a ticket number, etc., may be retrieved from database 110E.

In step 11, the server computer 110 may send an authorization request message to the authorizing computer 130 as part of an authorization process. The authorization request message may comprise the credentials of user 150-1 and the interaction data. The authorizing computer 130 may then send an authorization response message to the server computer 110 with an indication of whether or not the interaction is authorized.

FIG. 5 shows a block diagram and a process flow that differs from the process flow in FIG. 1. The process flow in FIG. 5 can illustrate an example that might involve an access device such as an automated teller machine (ATM), or a stationary badge reader. In one embodiment, the resource provider 120 may be a bank and the access device 125 may be a drive-up ATM. Camera device 170 may be a dashboard camera. The first and second communication devices 160-1, 160-2 may be smart phones containing previously-enrolled biometric templates of the first and second users 150-1, 150-2, respectively. Additional details regarding the entities and processes that they can perform are described above, and may be incorporated herein. Enrollment processes are described above and are also described with reference to FIG. 6.

In step 1, the first user 150-1 can indicate to the server computer 110 which resource provider and/or access device 125 they wish to access. In one embodiment, the first user 150-1 may speak a command to the camera device 170, indicating that they would like to access something from resource provider 120. For example, the first user 150-1 may articulate a phrase such as "John Smith would like to withdraw $20 in cash from a Big Bank ATM." The camera device 170 may extract the name of the resource provider 120 (e.g., "Big Bank ATM") from the voice message, and may then send it to the server computer 110, along with a location of the first communication device 160-1 and/or the camera device 170. The server computer 110 may then identify the access device 125. The server computer 110 may then identifiy the access device 125 that is currently proximate to the user 150-1 and the communication device 160-1.

In step 2, the camera device 170 can receive a location of the access device 125 that the server computer 110 has identified from the server computer 110. The camera device 170 may then communicate this location to the first user 150-1. In some embodiments, if the camera device 170 is connected to the first vehicle 140-1, the camera device 170 may interact with a navigation system of the first vehicle 140-1 to generate a route to the access device 125 if the first user 150-1 and the first vehicle 140-1 are not currently proximate to the access device 125.

In step 3, the first communication device 160-1 can detect that it is close to access device 125. In some embodiments, the detection process may utilize a geofence. When the first communication device 160-1 is within a predetermined range of the access device 125, the first communication device 160-1 can transmit enrolled biometric templates of at least two different types to the server computer 110. In some embodiments, the enrolled biometric template may be encrypted before they are transmitted to the server computer 110.

In step 4, the first user 150-1 may state a predetermined phrase or sentence. In some embodiments, the predetermined phrase or sentence may include an identifier of the access device 125. For example, the access device 125 may have an identification number (e.g., a four digit identification number). The user 150-1 may then say the identification number of the access device 125 in the predetermined sentence. An example of a predetermined sentence might be "Hello Dash Cam, John Smith would like to withdraw $20 in cash from Big Bank ATM No. 1555." Instructions for articulating a phrase such as this might be posted on the ATM. The predetermined phrase or sentence (e.g., "Hello Dash Cam") may trigger the camera device 170 to record the sentence and take a picture of the inside of the vehicle 140-1, including the first and second users 150-1, 150-2. The camera device 170 may then derive a sample voice print biometric template from the recording and sample facial scan biometric templates from the image.

In step 5, the camera device 170 may send a message to the server computer 110. In this example, the message may comprise the facial sample biometric templates of the first and second users 150-1, 150-2 and the sample voice print biometric template of first user 150-1. As in the examples described with respect to FIG. 1, the sample biometric templates may be encrypted before they are sent to the server computer 110. The message may also comprise interaction data and/or identifying information extracted from the recording of first user 150-1. The message may also comprise the identifier of the first communication device 160-1.

In step 6, the server computer 110 can proceed with user identification and biometric authentication processes using the first communication device 160-1 that was identified as the communication device of the first user 150-1. Examples of user identification and biometric authentication processes are described above in step 8 in FIG. 1 and the description is incorporated herein.

In step 7, in some embodiments, the server computer 110 may optionally request additional information via the communication device 160-1, camera device 170, and the access device 125. For example, in some embodiments, the first user 150-1 may send an indication that they are in front of the access device 125 to the server computer 110 via the communication device 160-1, camera device 170, and the access device 125. For instance, this may be done by the user saying a phrase such as "John Smith is in front of ATM #1555" to the camera device 170, and the camera device 170 may send this information to the server computer 110 to notify and confirm to the server computer 110 that the camera device 170 is proximate to the access device 125. Thus, the server computer 110 can be assured that any cash dispensed by the access device 125 will be dispensed to the first user 150-1.

After the first user 150-1 is authenticated and is determined to be close to the access device 125, in step 8, the server computer 110 may send an authorization request message to the authorizing computer 130. The authorizing computer 130 could be affiliated with the resource provider 120 if the resource provider is a bank. In some embodiments, the authorization request message may comprise the credentials of user 150-1 and the interaction data (e.g., the amount of money to be withdrawn as well as access credentials that may be stored on the server computer 110 in association with the first user 150-1 or the first communication device 160-1). In some embodiments, the authorization request message may be part of a card-on-file transaction. The authorizing computer 130 may then send an authorization response message to the server computer 110 with an indication of whether or not the interaction is authorized.

In step 9, the server computer 110 may then send the indication to the access device 125, and the indication may include instructions that cause the access device 125 to dispense funds to the first user 150-1. The access device 125 may then dispense the requested funds to the first user 150-1.

Prior to dispensing the funds, the access device 125 may request that the first user 150-1 confirm the funds to be distributed.

Figure 6:
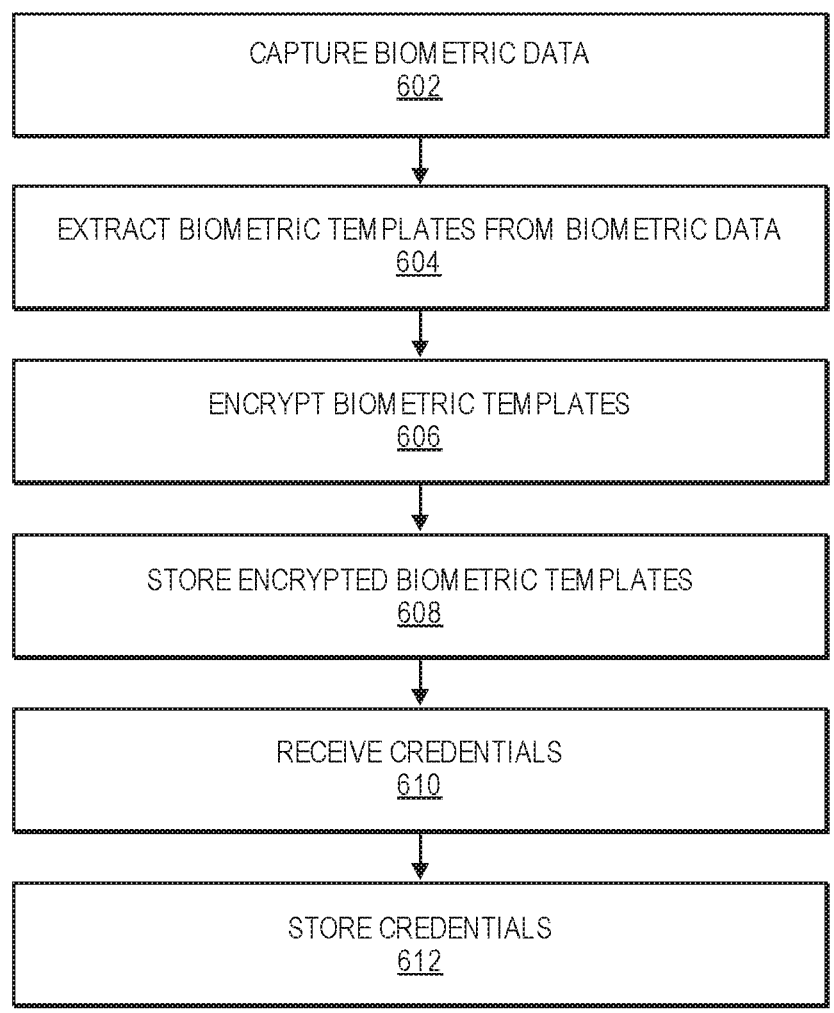
FIG. 6 shows a flow diagram of user enrollment according to embodiments.

FIG. 6 shows a flow diagram of user enrollment according to embodiments. Enrollment may occur prior to any interaction involving a camera device. A user may use a communication device (e.g., a smartphone) to enroll. In some embodiments, the user may enroll through an application on their communication device, such as a mobile banking app. It is noted that the order of steps in FIG. 6 may be changed or additional steps may be added in other embodiments, and embodiments are not limited to the sequence shown in FIG. 6.

In step 602, a communication device of a user can capture biometric data of the user. For example, the communication device may use a camera to capture an image of the face of the user. The communication device may also record the voice of the user, for example as the user is saying a predetermined phrase or sentence. The communication device may prompt the user to ensure that the quality of the biometric data. For example, the communication device may provide guides for the user to face the camera to take a good picture. The communication device may also recapture the biometric data in order to get data of sufficient quality.

In step 604, the communication device can derive a plurality of different biometric templates from the biometric data. The communication device may do this with an extraction module. For example, the communication device may derive a facial scan biometric template from the image of the user. The communication device may also derive a voice print biometric template from the recording of the user.

In step 606, the communication device can encrypt the plurality of biometric templates. For example, the communication device may encrypt the plurality of different biometric templates with a public key of public key/private key pair shared with a server computer or a symmetric key of a symmetric key pair shared with a server computer.

In step 608, the communication device can store the encrypted different biometric templates. In some embodiments, the communication device may store the encrypted biometric templates on a secure element. The communication device can then additionally or alternatively send the encrypted biometric templates to the server computer. Additionally, or alternatively, the communication device can send an indicator to the server computer that the communication device has an encrypted enrolled biometric template. Further, the communication device may also send a communication device identifier. The communication device identifier may be used by the server computer to later retrieve the encrypted biometric templates.

In step 610, credentials may be entered into the communication device. In some embodiments, the credentials may be payment credentials, such as a primary authentication number (PAN) from a credit or debit card, or a bank account number. Other examples of credentials may include value credentials, identification cards, certified documents, access cards, passcodes and other login information.

In step 612, the communication device may store the credentials. The credentials may be stored on a secure element of the communication device. Additionally, or alternatively, the communication device may send the credentials to the server computer.

In some embodiments, enrollment may be a one-time process. In other embodiments, the communication device may reenroll the user periodically, for example once per week or after each interaction. Periodic updates may increase accuracy as enrolled biometric template is being updated to match the current state of the user. Periodic updates may also increase security. Updating the enrolled biometric after each interaction may make the enrolled biometric template single use, which may maintain security if the enrolled biometric template is stolen or compromised.

There may also be a setup process for the camera device done prior to interactions involving the camera device. Setup may occur when the camera device is installed into a vehicle. During setup, a user may name a WiFi™ hotspot or Bluetooth™ connection of the camera device. The camera device may also be connected to a system of the vehicle. This may, for example, allow the camera device to use a display and/or speakers of the vehicle. Connecting the camera device to the vehicle may also allow the camera device to integrate with a location determination system of the vehicle. For example, the camera device may use the location determination system of the vehicle to generate location data about the location of the camera device. The camera device may also interface with a navigation system of the vehicle to direct the vehicle to a desired location, such as a resource provider that supports camera device interactions. For example, if a user wants to use the camera device to withdraw funds from an ATM, the camera device may receive an indication from a server computer about a suitable ATM and then direct the vehicle to determine a route to the ATM.

Figure 7:
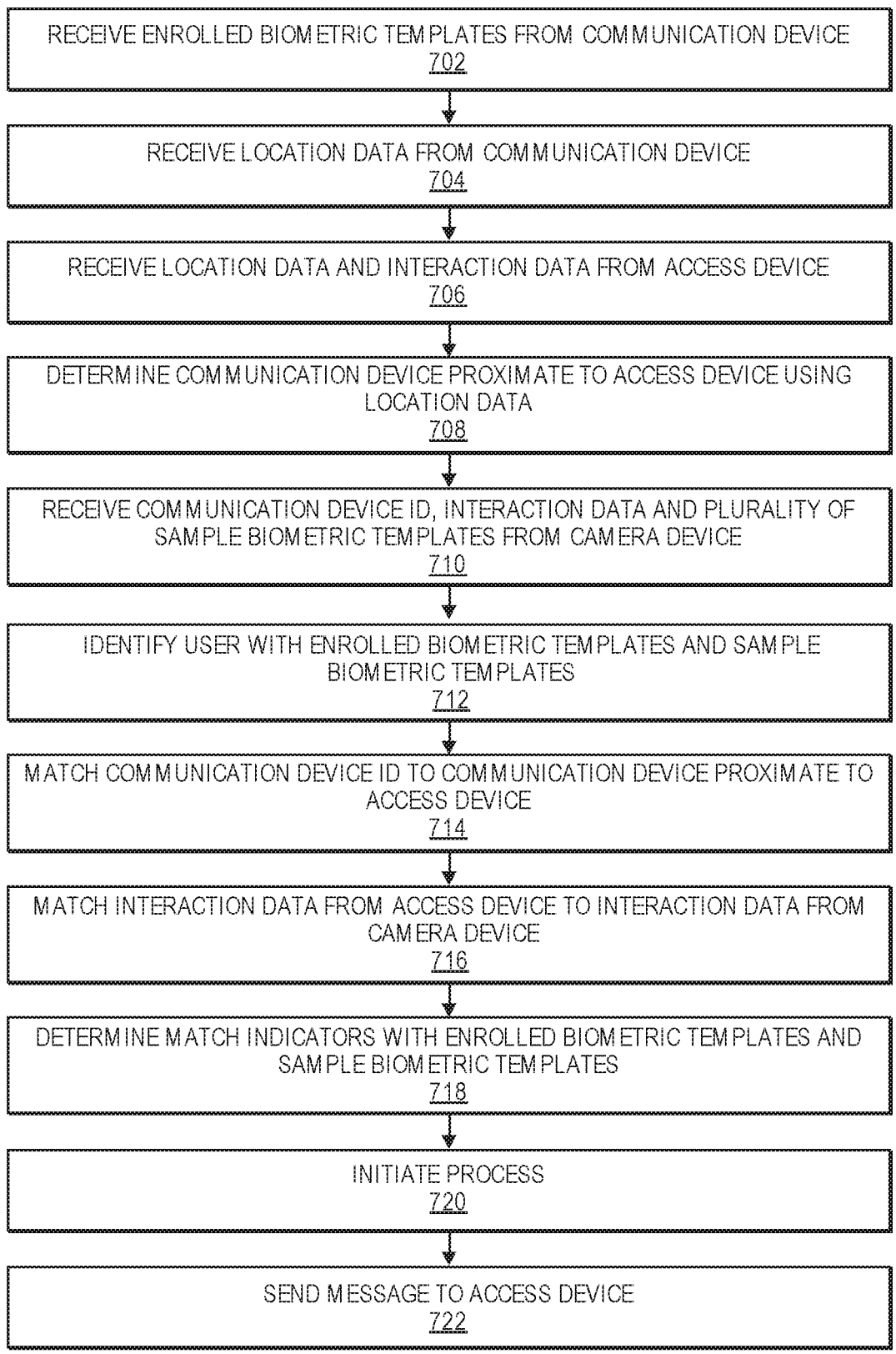
FIG. 7 shows a flow diagram of server mode authentication according to embodiments.

FIG. 7 shows a flow diagram for server-based authentication, according to some embodiments. In server-based authentication, the server computer may authenticate a user that is using a camera device to complete an interaction.

In step 702, the server computer may receive different enrolled biometric templates from a plurality of communication devices. Each communication device may send multiple enrolled biometric templates, such as a voice print biometric template and a facial scan biometric template. Alternatively, each communication device may send an indicator that the communication device has an encrypted enrolled biometric template. Each communication device may also send a communication device identifier. This step may occur as part of an enrollment process, such as that described in FIG. 6.

In step 704, the server computer may receive location data from the plurality of communication devices. For example, each device may periodically send its location as GPS coordinates. In some embodiments, the sever computer may receive location data from the communication devices only at certain times. For example, a geofence may be used to virtually denote an area around an access device. Then the server computer may receive an indication when a communication device has entered the geofenced area, and may only receive location data from communication devices within the geofenced area. Each communication device may also send a communication device identifier with the location data.

In step 706, the server computer may receive an access device location and interaction data from a resource provider computer, or an access device associated with the resource provider. In some embodiments, the server computer may receive the access device location once. If the access device is portable, the access device may send its location periodically. The interaction data may comprise a resource provider identifier and a transaction value.

In step 708, the server computer may use the location data from the communication devices and the access device location to determine one or more communication devices that are proximate to the access device. For example, the server computer may determine one or more communication devices that are within a 50 meter radius of the access device. If a geofence is used to determine location data, the server computer may only compare locations for communication devices that are within the access device. The server computer may compare the location of each of the communication devices to the location of the access device and determine one or more of the communication devices are within 50 meters of the access device. Additionally, or alternatively, location data may be stored in a database. The server computer may query the database to determine one or more devices proximate to a device. For example, the server computer may receive location data (e.g., GPS coordinates) from a communication device. The server computer may then query a database of access device location data. The server computer may then receive from the database the location of an access device that is closest to the communication device. The server computer can then determine a plurality of identifiers of communication devices that are close to the access device. The server computer may then determine a plurality of enrolled biometric templates using the plurality of communication device identifiers.

In step 710, the server computer may receive a message from a camera device. The message may comprise a communication device identifier, interaction data, and a plurality of sample biometric templates. The sample biometric templates may be a sample voice print biometric template and/or one or more facial scan biometric templates of users proximate to the camera device. In particular, there may be a sample voice print biometric template of the user, and sample facial scan biometric templates from a plurality of users. The message may additionally comprise identifying information about the user (e.g., the user's name).

In step 712, the server computer may identify the user from the plurality of users proximate to the access device and proximate to the camera device using the plurality of different biometric templates. For example, the server computer may compare the sample facial scan biometric templates from the camera device to enrolled facial scan biometric templates associated with communication devices that are proximate to the access device. In this way, the camera device may be able to reduce the number of candidate users to those that are confirmed to be both proximate to the access device and proximate to the camera device. The server computer may then compare the sample voice print biometric template to the enrolled voice print biometric template of the reduced set of candidate users. In this way the server computer may be able to identify the user that initiated the interaction and is proximate to the camera device and the access device.

In step 714, the server computer may match the communication device identifier received from the camera device to a communication device identifier of a communication device proximate to the access device. This may allow the server computer to confirm that the camera device is proximate to the access device as well, and that the communication device, camera device, and access device are all part of the same interaction.

In step 716, the server compute may match the interaction data received from the access device to the interaction data received from the camera device. The access device may have sent information about a plurality of interactions. The server computer may therefore determine the particular interaction that the camera device is involved in. There may also be more than one access device that the communication device is close to.

In step 718, the server computer can determine a plurality of match indicators. Determining the match indicators may include generating the match indicators by matching the enrolled biometric templates to the sample biometric templates received from the camera device. The match indicators may have been generated as part of the identification process of step 712. The enrolled biometric templates and/or the sample biometric templates may be encrypted, as described above.

In step 720, the server computer can initiate a process on behalf of the user. For example, once the communication device has been identifier and/or authenticated, the server computer can retrieve the credentials associated with the communication device. In some embodiments the credentials may be payment credentials. The server computer may then be able to initiate a card-on-file transaction using the payment credentials and the interaction data. As part of the process, the server computer may send an authorization request message to an authorizing computer. The authorizing computer may send an authorization response message indicating whether or not the interaction is authorized.

In step 722, the server computer can send a message to the access device indicating if the user is authenticated and the interaction is authorized. The access device may then be able to allow the user access to a resource.

A number of variations can be envisioned relative to the process described above with respect to FIG. 7.

In some embodiments, the process of FIG. 7 can be completed if the communication device is at a location that is remote from the camera device and the access device. In this example, the camera device may still be connected to the communication device. In some embodiments, the camera device may send a request message to the server computer with a request to connect to a communication device. The request message may comprise an identifier of the communication device (e.g., a phone number). The server computer may then attempt to connect with the communication device. In order to connect with the server computer, the communication device may be on and may have communication signal (e.g., cellular signal, WiFi™) The server computer may also check that the communication device is enrolled. If the server computer can connect with the communication device and the communication device is enrolled, the server computer may send a response message to the camera device indicating that the camera device may connect to the communication device.

In step 704, the server computer may not receive location data from the communication device. The server computer may alternatively receive location data from the camera device.

In step 708, if the server computer received location data from the camera device, it can use the camera device location data to match the camera device to a proximate access device.

In step 710, the communication device identifier that the camera device sends may be the communication device identifier of the connected communication device. The user of the connected communication device may still be proximate to the camera device (e.g., in the vehicle with the camera device). Therefore the camera device can still send a plurality of sample biometric templates of the user to the server computer.

In step 714, the server computer may not be able to determine that the communication device is proximate to the access device. Instead, it may use the location of the camera device to conclude that the user is proximate to the access device. It may then use the communication device identifier of the communication device that is connected to the camera device.

In step 718, the server computer may connect with the connected communication device to perform the biometric authentication process and determine the plurality of match indicators, as explained above.

Figure 8:
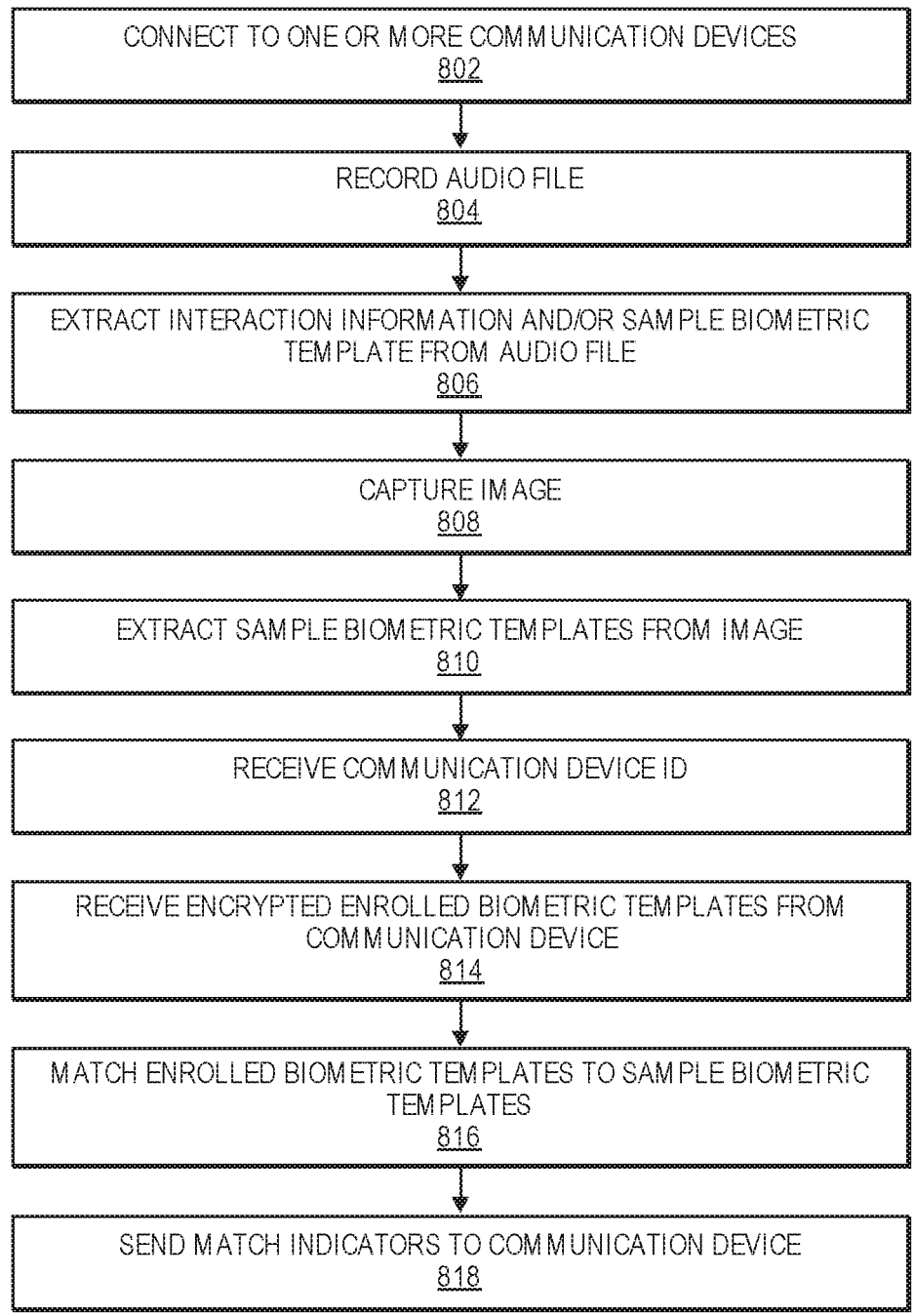
FIG. 8 shows a flow diagram of local mode authentication according to embodiments.

FIG. 8 shows a flow diagram for local authentication. In local authentication, the camera device may authenticate a user in an interaction with an access device, without the presence of a server computer. The camera device may be mounted inside of a vehicle.

In step 802, the camera device may connect to one or more communication devices. The camera device may connect via WiFi™, Bluetooth™ or some other short range communication. The camera device may establish a WiFi™ hotspot to allow the communication devices to connect. In some embodiments, the communication devices may send encrypted enrolled biometric templates to the camera device. The camera device may store the encrypted enrolled biometric templates after the communication devices disconnect. The user may be able to indicate trusted camera devices that may store the encrypted biometric templates, to prevent the biometric data from being stored on a shared camera device and/or a camera device that is not trusted. The camera device may be configured to clear the encrypted enrolled biometric templates if it is removed from a vehicle to prevent the encrypted enrolled biometric templates from being compromised.

In step 804, the camera device may receive a trigger to begin recording an audio file. The trigger may be user saying a predetermined phrase or sentence. For example, if the camera device is a dashboard camera, the predetermined phrase may begin "Hey, dash-cam . . . "

In step 806, the camera device may extract information from the audio file. For example, the camera device may derive a sample voice print biometric template from the audio file. The user may have also included interaction data (e.g., a resource provider name, a transaction value) and/or identifying information (e.g., the user's name) in the predetermined sentence. In some embodiments, some of the information may be spoken by entities other than the user. For example, the interaction data may be spoken by an operator of the access device. The camera device may extract the interaction data and/or the identifying information from the audio file. If the camera device was not able to extract an expected piece of information (e.g., because the user did not say it, because the recording quality was bad) the camera device may prompt the user to record the missing information.

In step 808, the camera device may take a picture of the inside of the vehicle, including one or more users inside the vehicle. The camera device may have been triggered to do so by the predetermined phrase or sentence as in step 804. The camera device may prompt users in the vehicle to position themselves in such a way as to provide a clear image of each user's face (e.g., instructions to lean towards the camera device, to face the camera device). In some embodiments, the camera device may use facial recognition software to detect when all users are facing the camera. In some embodiments the camera device may take the image automatically (e.g., when it detects that all users are facing the camera) or when a user provides an additional trigger (e.g., a voice command).

In step 810, the camera device may derive sample biometric templates from the image. For example, the camera device may derive a sample facial scan biometric template of each user in the image.

In step 812, the camera device may receive a communication device identifier from one of the communication devices that they camera device connected to in step 802. The communication device may have been triggered to send the communication device identifier by the user saying the predetermined phrase or sentence. Therefore, the communication device that sends the communication device identifier may be operated by the user. It may be that the predetermined phrase or sentence triggers more than one communication device to send a communication device identifier.

In step 814, the camera device may receive a plurality of different enrolled biometric templates from the communication device of step 812. The different enrolled biometric templates may be encrypted. The different enrolled biometric templates may be voice prints and/or facial scans. If more than one device was triggered in step 812, the camera device may receive a plurality of different encrypted biometric templates from more than one communication device. The camera device and the communication device(s) may then perform the user identification and biometric authentication processes described above (e.g., using SMPC and/or homomorphic encryption).

In some embodiments, the matching may occur on the camera device. For example, the camera device may match an enrolled facial scan biometric template received from the communication device to the plurality of sample facial scan biometric templates derived from the image and identify the sample biometric template that matches. The camera device may then match an enrolled voice print biometric template from the communication device to a sample voice print biometric template derived from the audio file. If all of the enrolled biometric templates match sample biometric templates, the camera device may authenticate the user.

The camera device may have received different enrolled biometric templates from more than one device. The user of each device is likely in the vehicle and therefore likely in the image taken by the camera device. Therefore, each enrolled facial scan biometric template may match a sample facial scan biometric template derived by the camera device. However, the predetermined phrase or sentence may have only been spoken by one user. Therefore, only the enrolled voice print biometric template of that user may match the sample voice print biometric template. This may allow the camera device to identify the user completing the interaction in addition to authenticating the user.

In step 818, the camera device may send the plurality of match indicators to the communication device. The match indicators may allow the communication device to confirm that the user is authenticated. The communication device may then initiate a process. The communication device can retrieve the credentials stored on the communication device. In some embodiments the credentials may be payment credentials. The communication device may then be able to initiate a card-on-file transaction using the payment credentials and the interaction data. As part of initiating the process, the communication device may send an authorization request message to an authorizing computer. The authorizing computer may send an authorization response message indicating whether or not the interaction is authorized.

In some embodiments, the communication device may send the plurality of match indicators to a server computer. The server computer may determine the plurality of match indicators and confirm that the user is authenticated. The server computer may then initiate a process. The server computer may also have received interaction data about the interaction prior to initiating the process. The server computer can retrieve stored credentials. As part of initiating the process, the server computer may send an authorization request message to an authorizing computer. The authorizing computer may send an authorization response message indicating whether or not the interaction is authorized.

Figure 9:
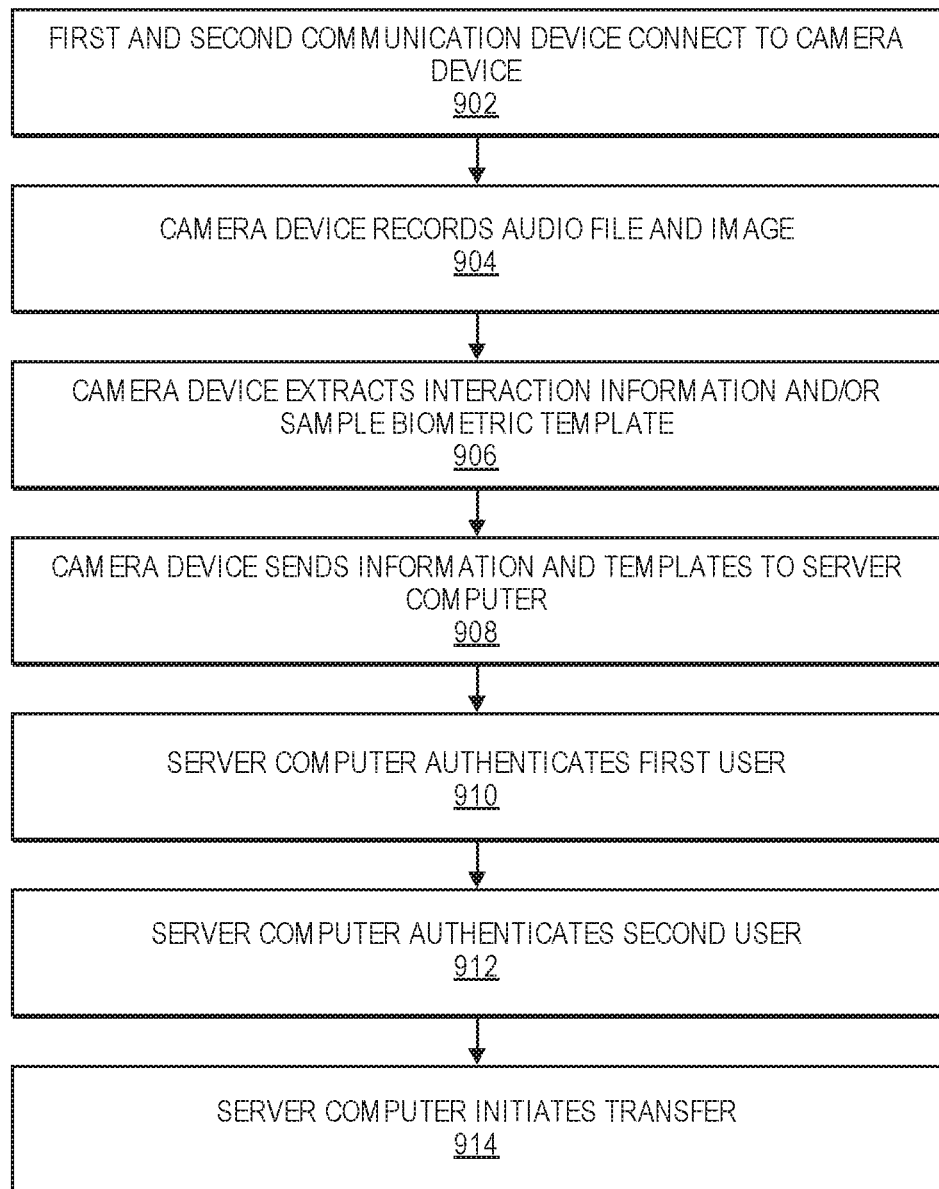
FIG. 9 shows a flow diagram of person to person transfer according to embodiments.

Some embodiments may allow users to transfer a resource to other users, for example, another user in the vehicle. FIG. 9 shows a flow diagram of one such interaction according to embodiments. This may be a variant on the server based authentication or the local authentication. A server-based embodiment is described. A first and second communication device may each be enrolled, for example, following the method of FIG. 6.

In step 902, a first and second user can connect first and second communication devices to camera device. Each communication device may then send a communication device identifier to the camera device. Each communication device may also send an encrypted enrolled biometric template to the camera device.

In step 904, the first user may say a predetermined sentence, indicating that they wish to transfer a resource to the second user. The first user may say an amount to transfer, and the name of the second user or some other identifier (e.g., the second user's phone number). For example, the user may say "Hey dash-cam, Jane Doe would like to send $20 to John Smith." The predetermined sentence may trigger the camera device to initiate an authentication process and begin recording an audio file. The camera device may record the predetermined sentence. The predetermined sentence may also trigger the camera device to take an image of the inside of the vehicle, including the first and second users.

In step 906, the camera device may derive information from the audio file and the image. The camera device may derive a sample voice print biometric template of the first user from the audio file. The camera device may also extract the transfer amount and/or the identifier of the second user from the audio file. The camera device may also derive sample facial scan biometric templates of the first and second users from the image.

In step 908, the camera device may initiate generating a plurality of match indicators. In doing so, the camera device may send communication device identifiers, and different sample biometric templates to a server computer. The camera device may encrypt the different sample biometric templates prior to sending them to the server computer. The camera device may also send the transfer amount, and indications of who the sender and who the recipient are.

In step 910, the server computer can proceed with a biometric authentication process of the first user by validating different biometric templates of the first user. Examples of biometric match processes are described in detail above. For example, the server computer may use an enrolled voice print biometric template and the sample voice print biometric template to authenticate the first user. The biometric authentication may occur in the encrypted domain, or may be performed using SMPC as described above. The server computer may communicate with the first communication device to complete the biometric authentication. The server computer also may then use an enrolled facial scan biometric template stored on the first communication device. The server computer may have a plurality of sample facial scan biometric templates from the camera device, including ones from the first and second users. The server computer may then attempt to complete the biometric authentication process with the first communication device until it receives or determines positive match indicators.

In step 912, the server device may identify the second user as the recipient and authenticate the second user. For example, the server computer may verify that the identifier of the second communication device is associated with a user that has matches the recipient information. The server computer may also use biometrics of the second user to authenticate second user as recipient. The authentication of the second device may occur similarly to the authentication of the first device, as described above. In some embodiments, the server computer may request additional information about the second user and/or the second device to complete authentication. For example, the sever computer may request a sample voice print biometric template of the second user from the camera device. The camera device may prompt the second user to say a predetermined phrase or sentence, record an audio file, and then derive a sample voice print biometric template of the second user from the audio file. The camera device may then send the sample voice print biometric template and other different biometric templates to the server computer to authenticate the second user.

In step 914, the server computer may then initiate the transfer from the first user to the second user. The server computer can retrieve credentials of the first user associated with the first communication device. In some embodiments the credentials may be payment credentials. As part of initiating the transfer, the server computer may send an authorization request message to an authorizing computer. The authorizing computer may send an authorization response message indicating whether or not the interaction is authorized.

In some embodiments, the camera device may initiate the generation of a plurality of match indicators by performing local-mode authentication. This may be done by following a process similar to that described with respect to FIG. 8.

Embodiments of the invention provide a number of advantages. One advantage is that it is an open system, passengers can easily pay from a vehicle that is not their own. Embodiments can maintain security even when used in a shared or unfamiliar vehicle. Hierarchical biometric matching (face and voice) can provide an efficient way to both narrow down the a plurality of potential users and authenticate the user. This may allow a lower biometric matching threshold to be used because there are multiple forms, and this means that the biometric information captured by the camera device does not need to be perfect. Embodiments may also reduce dependence on high-accuracy location data, as there are multiple pieces of information connecting the user to an interaction with a particular access device, which may allow communication devices to devote less time and power to determining location.

Embodiments of the invention can also be completely hands free. All steps that involve a communication device can be performed while a user's communication device is present in the user's pocket, bag, purse, or even when the user is separated from the communication device (e.g., at home). This can allow users to safely complete interactions and in an efficient manner.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer from an access device, first interaction data comprising a first timestamp and a first transaction amount regarding an interaction between a user associated with a communication device, and the access device, the user being proximate to a plurality of candidate users within a car at a time of the interaction;
   receiving, by the server computer from a camera device proximate to the user and separate from the access device, second interaction data comprising a second timestamp and a second transaction amount regarding the interaction, wherein the camera device is within the car;
   determining, by the server computer, that the camera device and the access device are part of the same interaction by comparing the first timestamp and the second timestamp to determine if the first and second timestamps substantially match, and comparing the first transaction amount and the second transaction amount to determine if the first and second transaction amounts match;
   obtaining, by the server computer, a plurality of match indicators, the plurality of match indicators generated by comparing a plurality of different sample biometric templates of the user with a plurality of different enrolled biometric templates, the plurality of different sample biometric templates comprising an image-based biometric template and a sample voice print biometric template, the plurality of different sample biometric templates obtained by the camera device proximate to the user;
   identifying, by the server computer, the user from the plurality of candidate users within the car based on at least the match indicator associated with the sample voice print biometric template; and
   if the plurality of match indicators are positive match indicators, then initiating, by the server computer, a process on behalf of the user.

2. The method of claim 1, wherein the first interaction data includes an access device location, and the method further comprises:
   receiving, by the server computer, location data and communication device identifiers from a plurality of communication devices proximate to the access device, which includes the communication device;

comparing, by the server computer, the access device location to the location data;

determining, by the server computer, a communication device identifier for the communication device using the comparing step; and determining, by the server computer, the plurality of different enrolled biometric templates using the communication device identifier.

3. The method of claim 1, further comprising:

comparing, by the server computer, the plurality of different sample biometric templates of the user with the plurality of different enrolled biometric templates.

4. The method of claim 1, further comprising:

receiving the plurality of match indicators from the camera device or the communication device.

5. The method of claim 1, wherein the plurality of different sample biometric templates and the plurality of different enrolled biometric templates are encrypted, and wherein comparing the plurality of different sample biometric templates of the user with a plurality of different enrolled biometric templates occurs in an encrypted domain.

6. The method of claim 1, wherein the communication device is at a remote location from the user.

7. The method of claim 1, wherein at least one of the plurality of different enrolled biometric templates is a voice print biometric template.

8. The method of claim 1, wherein at least one of the plurality of different enrolled biometric templates is a facial scan biometric template.

9. The method of claim 1, wherein the second interaction data is derived from an audio file obtained by a microphone of the camera device proximate to the user.

10. A server computer comprising:

a processor; and a computer readable medium, coupled to the processor, for performing a method comprising:

receiving, from an access device, first interaction data comprising a first timestamp and a first transaction amount regarding an interaction between a user associated with a communication device and the access device, the user being proximate to a plurality of candidate users in a car at a time of the interaction;

receiving, from a camera device proximate to the user and separate from the access device, second interaction data comprising a second timestamp and a second transaction amount regarding the interaction, wherein the camera device is within the car;

determining that the camera device and the access device are part of the same interaction by comparing the first timestamp and the second timestamp to determine if the first and second timestamps substantially match, and comparing the first transaction amount and the second transaction amount to determine if the first and second transaction amounts match;

obtaining a plurality of match indicators, the plurality of match indicators generated by comparing a plurality of different sample biometric templates of the user with a plurality of different enrolled biometric templates, the plurality of different sample biometric templates comprising an image-based biometric template and a sample voice print biometric template, the plurality of different sample biometric templates obtained by the camera device proximate to the user;

identifying, by the server computer, the user from the plurality of candidate users in the car based on at least the match indicator associated with the sample voice print biometric template; and if the plurality of match indicators are positive match indicators, then initiating, by the server computer, a process on behalf of the user.

11. The server computer of claim 10, wherein the first interaction data includes an access device location, and the method further comprises:

receiving location data and communication device identifiers from a plurality of communication devices proximate to the access device, which includes the communication device;

comparing the access device location to the location data;

determining a communication device identifier for the communication device using the comparing step; and determining the plurality of different enrolled biometric templates using the communication device identifier.

12. The server computer of claim 10, the method further comprising:

comparing the plurality of different sample biometric templates of the user with the plurality of different enrolled biometric templates.

13. The server computer of claim 10, the method further comprising:

receiving the plurality of match indicators from the camera device or the communication device.

14. The server computer of claim 10, wherein the plurality of different sample biometric templates and the plurality of different enrolled biometric templates are encrypted, and wherein comparing the plurality of different sample biometric templates of the user with a plurality of different enrolled biometric templates occurs in an encrypted domain.

15. The server computer of claim 10, wherein the communication device is at a remote location from the user.

16. The server computer of claim 10, wherein at least one of the plurality of different enrolled biometric templates is a voice print biometric template.

17. The server computer of claim 10, wherein at least one of the plurality of different enrolled biometric templates is a facial scan biometric template.

* * * * *